United States Patent
Sylvester et al.

(10) Patent No.: US 6,618,018 B1
(45) Date of Patent: Sep. 9, 2003

(54) MOUNTING ASSEMBLY FOR MOUNTING ANTENNA TO VEHICLE

(75) Inventors: Jeffery A. Sylvester, Dallas, GA (US); Wesley Brown Ecton, Loganville, GA (US); Jerome R. Timko, Lilburn, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 10/008,504

(22) Filed: Nov. 8, 2001

(51) Int. Cl.[7] ................................. H01Q 1/32
(52) U.S. Cl. ....................... 343/713; 343/715
(58) Field of Search ...................... 343/711, 712, 343/713, 715; H01Q 1/32

(56) References Cited

U.S. PATENT DOCUMENTS

| | | | | |
|---|---|---|---|---|
| 3,729,741 A | * | 4/1973 | Otto | 343/713 |
| 3,864,686 A | * | 2/1975 | Owen | 343/713 |
| 4,107,695 A | * | 8/1978 | Urban et al. | 343/882 |
| 4,114,158 A | * | 9/1978 | Verini | 343/715 |
| 4,134,121 A | * | 1/1979 | Northcutt | 343/715 |
| 4,535,336 A | * | 8/1985 | Shaver | 343/713 |
| 5,048,641 A | * | 9/1991 | Holcomb et al. | 182/127 |

* cited by examiner

Primary Examiner—Tho Phan
(74) Attorney, Agent, or Firm—Woodcock Washburn LLP

(57) ABSTRACT

A mounting assembly is disclosed for mounting an antenna to a roof of a vehicle. The assembly includes a mounting plate with a mounting pad for mounting the antenna to the mounting plate, and at least one bracket to which the mounting plate is mounted. Each bracket is for being mounted to the roof of the vehicle. Each bracket may be a cross-bracket for extending between stringers on the vehicle or an angle-bracket for being mounted to a vertical surface on the vehicle, for example. The mounting plate and each bracket are each provided with a plurality of regularly spaced slots through which the mounting plate is mounted to the bracket. Each slot in the mounting plate extends for a distance generally along the periphery of the mounting plate, and each slot in each bracket extends for a distance generally longitudinally.

13 Claims, 5 Drawing Sheets

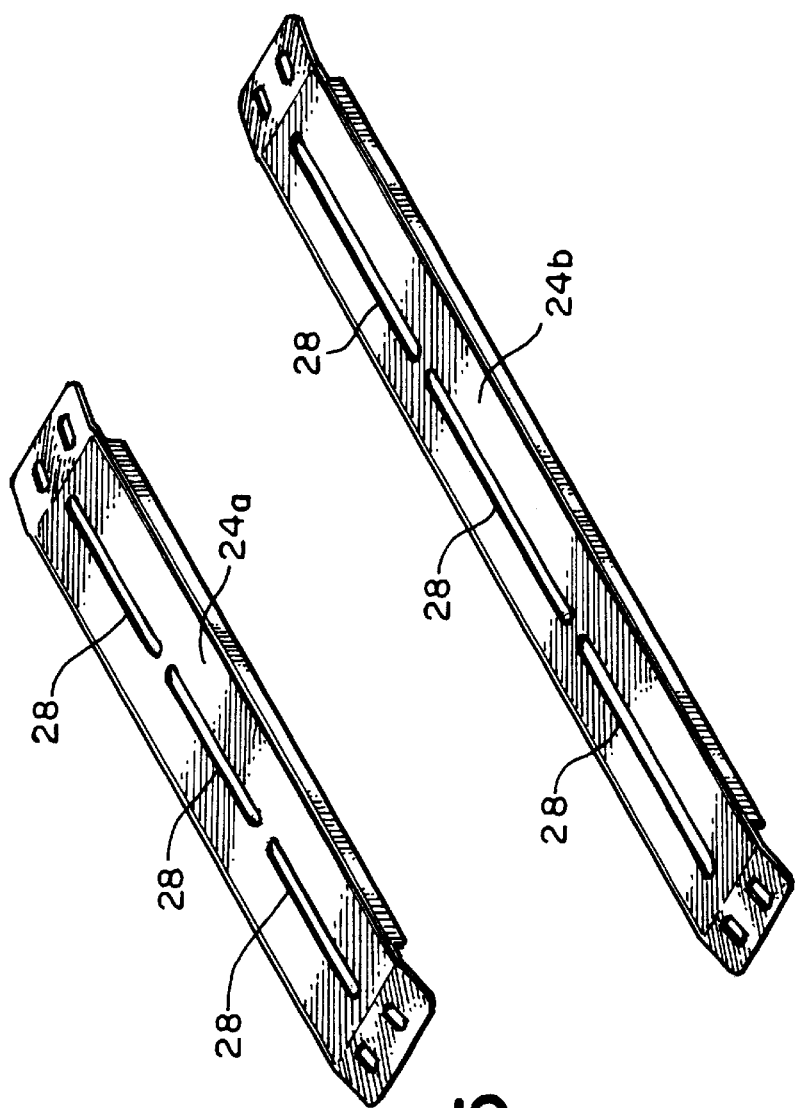

MOUNTING ASSEMBLY FOR MOUNTING ANTENNA TO VEHICLE

FIELD OF THE INVENTION

The present invention relates to a mounting assembly for mounting one or more antennae atop a vehicle or the like. More particularly, the present invention relates to such a mounting assembly that minimizes or eliminates the need to create mounting apertures within the roof of the vehicle.

BACKGROUND OF THE INVENTION

It is oftentimes desirable to mount one or more antennae or the like to the top of a vehicle or the like. For example, in a service business that dispatches service technicians in service vehicles, it may be that each service vehicle includes a communications device for effectuating communications between the technician(s) in the vehicle and a dispatcher or the like and a positioning device for determining the position of the vehicle and reporting same to the dispatcher or the like, and the technician(s) may each carry a panic device for being actuated in case of an emergency and for transmitting a panic alert to the dispatcher,or the like by way of the communications device of the vehicle. Further, it may be that each of the communications device, the positioning device, and the panic device has a separate associated antenna on the vehicle, and each antenna must be mounted to the top of the service vehicle.

However, it is to be appreciated that mounting each antenna directly to the top of the service vehicle can require that multiple apertures be created within the roof of such service vehicle for each antenna so that the antenna itself may be attached to the roof and so that a cable extending from the antenna to a corresponding device may be passed through the roof and to the device within the vehicle. As may be appreciated, such apertures may be created by drilling or other appropriate methods. If, for example, each of the three aforementioned antennae requires two apertures in the roof for mounting thereof and one aperture in the roof for the corresponding cable, a total of nine separate apertures are required. Significantly, each such aperture represents a significant risk of water leakage through the roof and into the vehicle by way of such aperture, and the risk increases as the number of such apertures increases.

Accordingly, a need exists for a mounting assembly for mounting one or more antennae or the like to a roof of a vehicle or the like, where the mounting assembly minimizes the number of apertures that must be created within the roof of the vehicle in connection with mounting such antennae to such vehicle.

SUMMARY OF THE INVENTION

The present invention satisfies the aforementioned needs by setting forth a mounting assembly for mounting an antenna to a roof of a vehicle. The assembly includes a mounting plate with a mounting pad for mounting the antenna to the mounting plate, and at least one bracket to which the mounting plate is mounted. Each bracket is for being mounted to the roof of the vehicle. Each bracket may be a cross-bracket for extending between stringers on the vehicle or an angle-bracket for being mounted to a vertical surface on the vehicle, for example. The mounting plate and each bracket are each provided with a plurality of regularly spaced slots through which the mounting plate is mounted to the bracket. Each slot in the mounting plate extends for a distance generally along the periphery of the mounting plate, and each slot in each bracket extends for a distance generally longitudinally.

BRIEF DESCRIPTION OF THE DRAWINGS

The foregoing summary as well as the following detailed description of the present invention will be better understood when read in conjunction with the appended drawings. For the purpose of the illustrating the invention, there are shown in the drawings embodiments which are presently preferred. As should be understood, however, the invention is not limited to the precise arrangements and instrumentalities shown. In the drawings:

FIGS. 5 and 6 are top plan views, respectively, of a short cross-brackets and a long cross-brackets 24b for mounting the mounting plate of FIGS. 1 or 2 to the vehicle of FIGS. 3 or 4;

DETAILED DESCRIPTION OF PREFERRED EMBODIMENTS

Figure 1:
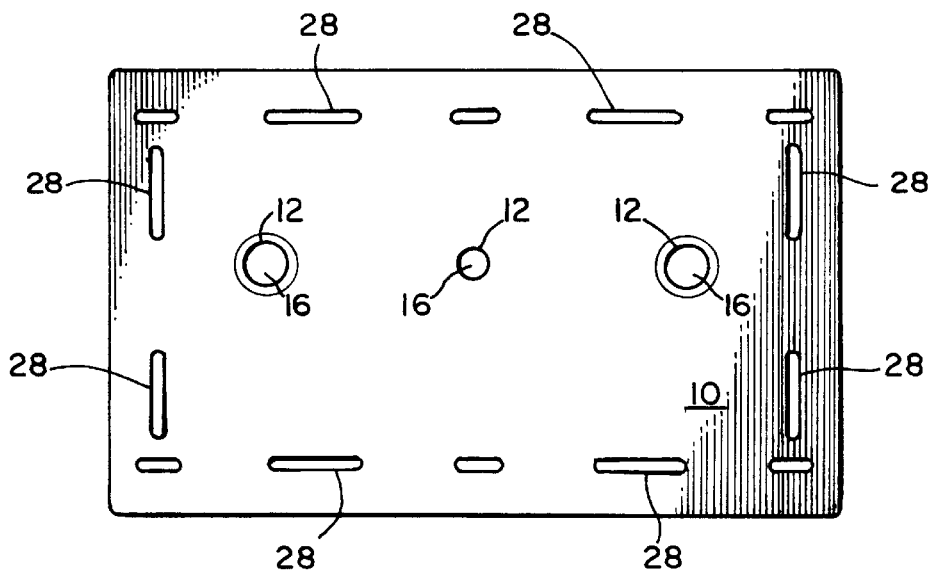
FIG. 1 is a plan view of a mounting plate in accordance with one embodiment of the present invention.

Certain terminology may be used in the following description for convenience only and is not considered to be limiting. For example, the words "left", "right", "upper", and "lower" designate directions in the drawings to which reference is made. Likewise, the words "inwardly" and "outwardly" are directions toward and away from, respectively, the geometric center of the referenced object. The terminology includes the words above specifically mentioned, derivatives thereof, and words of similar import.

Figure 2:
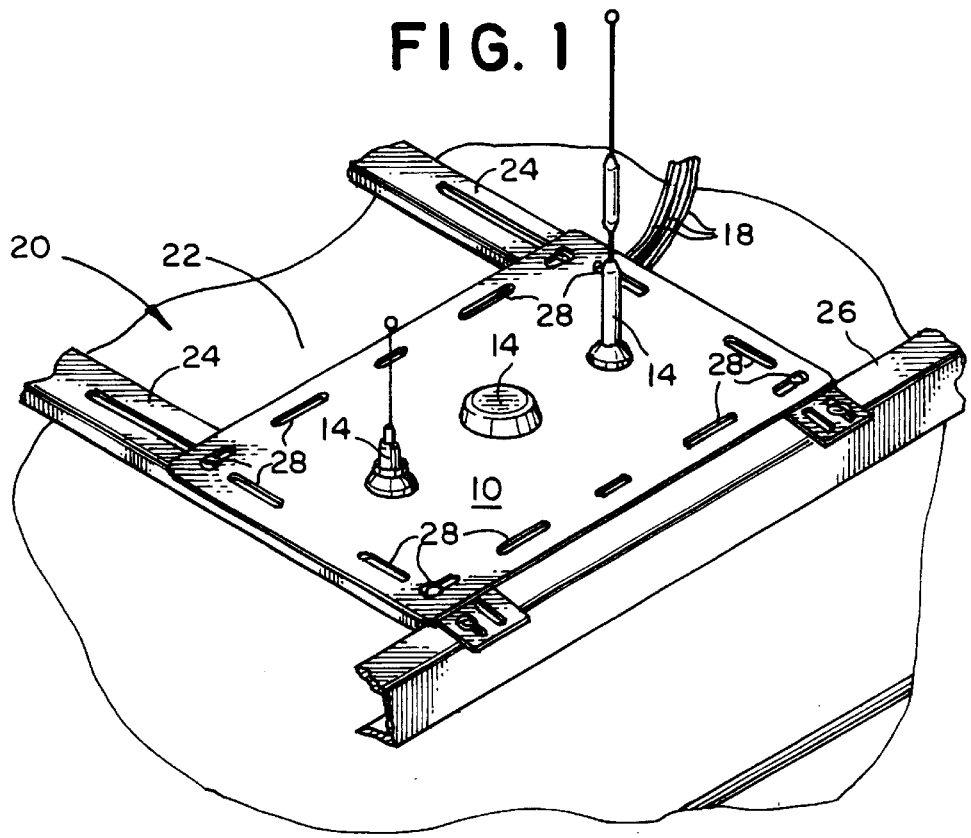
FIG. 2 is a perspective view of the mounting plate of FIG. 1 with a plurality of antennas mounted thereto.

Referring to the drawings in detail, wherein like numerals are used to indicate like elements throughout, there is shown in FIGS. 1 and 2 a mounting plate 10 constructed in accordance with one embodiment of the present invention. As may be appreciated, the mounting plate 10 includes a plurality of mounting pads 12 (FIG. 1), each pad 12 for having an antenna 14 mounted thereto (FIG. 2). For example, and as shown in FIG. 2, the mounting plate 10 may have a communications antenna 14 for effectuating voice and/or data communications, a positioning antenna 14 for effectuating position determination, and a panic antenna 14 for receiving notification of an emergency from a technician. Of course, other types and numbers of antennas may be mounted on the mounting plate 10 by way of appropriately defined mounting pads 12, all without departing from the spirit and scope of the present invention.

As shown, the mounting plate 10 of the present invention is generally planar and is a generally unitary body formed from an appropriate material such as a plastic or a metal. The method of formation may include stamping, molding, cutting, or the like. Notably, any appropriate shape, material, method of formation of the mounting plate 10 may be employed without departing from the spirit and scope of the present invention.

Each antenna 14 is mounted to the mounting plate 10 at a respective pad 12 thereof by way of one or more apertures 16 defined within the mounting plate 10 at the pad 12 and extending therethrough from one planar surface of the mounting plate to the other planar surface (FIG. 1). It is to be recognized that each pad 12 may have only a single aperture 16 defined therein, as shown in FIG. 1, in which case the antenna 14 is mounted by way of and an associated cable 18 (FIG. 2) extends through the single aperture 16, or each pad 12 may have multiple apertures 16 defined therein (not shown), in which case the antenna 14 is mounted by way of at least one aperture 16 and an associated cable 18 extends through at least one other aperture 16. Any particular mounting arrangement and number of apertures 16 may be employed for mounting each antenna 14 to a corresponding pad 12 without departing from the spirit and scope of the present invention.

Figure 3:
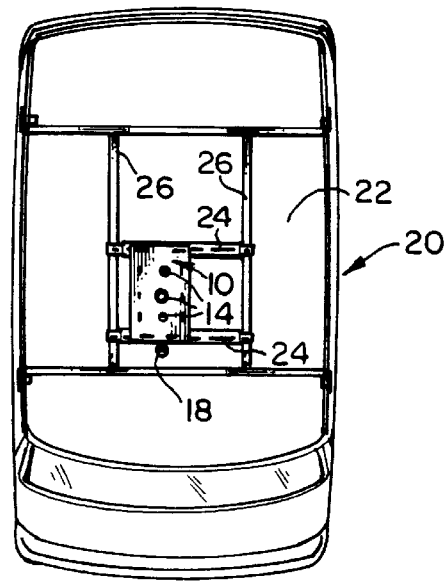
FIG. 3 is a top plan view of the mounting plate of FIG. 2 mounted to a roof of a service vehicle or the like in accordance with one embodiment of the present invention.

As is to be appreciated, and as seen for example in FIG. 3, the mounting plate 10 with the antenna(s) 14 mounted thereto is in turn mounted to a service vehicle 20 or the like in the area of the roof 22 thereof, and the cables 18 associated with the antenna(s) 14 extend from the mounting plate 10 into the service vehicle 20 to appropriate receivers, transmitters, transceivers, or the like (not shown), perhaps through the roof 22. Importantly, mounting the antennas 14 to the mounting plate 10 and not directly to the roof 22 minimizes the number of apertures that must be created within such roof 22. In one embodiment, if the cables 18 do indeed extend through the roof 22, such cables are gathered into a single assemblage and passed through the roof 22 by way of a single aperture therein. Thus, the single roof aperture for the assemblage of cables 18 represents a minimal risk of water leakage through the roof and into the vehicle by way of such aperture.

Figure 4:
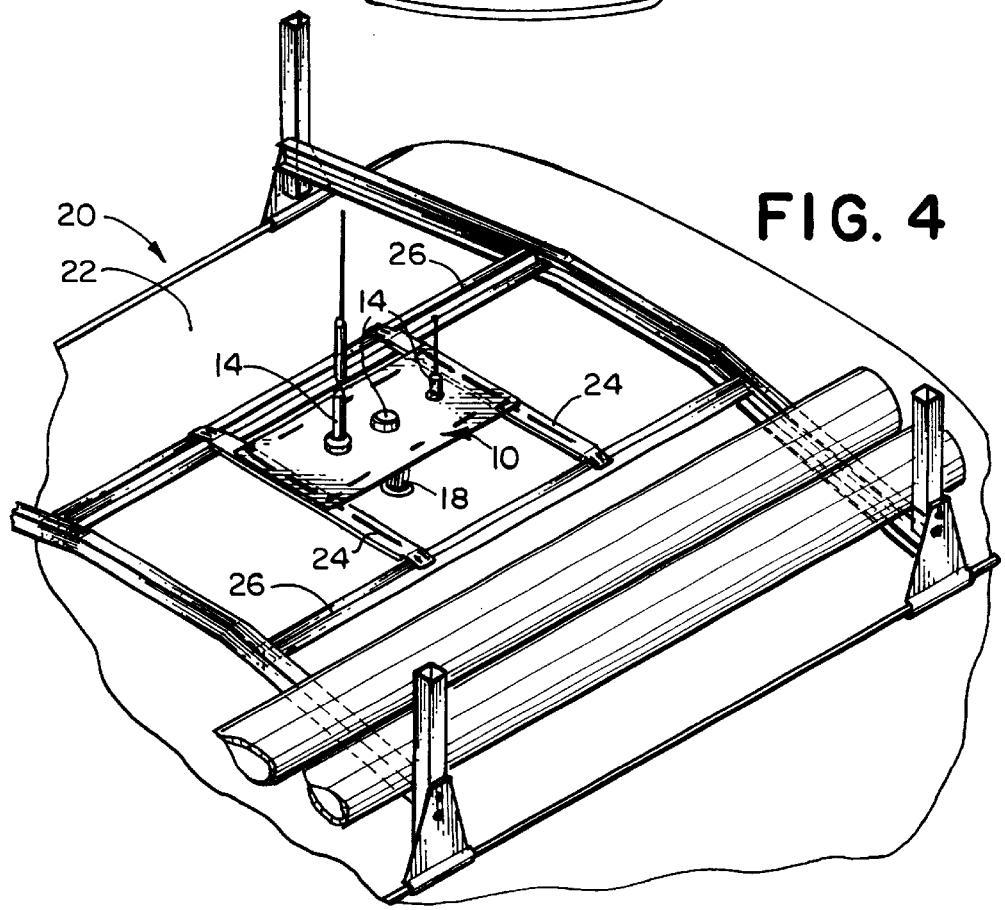
FIG. 4 is a perspective view of the mounting plate and vehicle of FIG. 3.

In the present invention, and as seen in FIG. 4, the mounting plate 10 with the antenna(s) 14 mounted thereto is in turn mounted to the service vehicle 20 or the like without directly contacting the roof 22 thereof. As may be appreciated, then, mounting the mounting plate 10 to the vehicle 20 does not require creation of any corresponding mounting apertures in the roof 22. Thus, the lack of mounting apertures for the mounting plate 10 eliminates the risk of water leakage through the roof and into the vehicle by way of such mounting apertures.

In particular, in one embodiment of the present invention as shown in FIGS. 3 and 4, the mounting plate 10 is mounted to a pair of cross-brackets 24 that are positioned generally transversely with respect to the vehicle 20, and the cross-brackets 24 are each in turn mounted to a pair of stringers 26 that are positioned generally longitudinally with respect to the vehicle 20. As may be appreciated, the stringers 26 may already be present on the vehicle 20 and may for example be stringers 26 in a rack already present on the roof 22 of the vehicle 20. Such a rack may for example be employed to stow a ladder (not shown), or to hold a PVC tube (FIG. 4) within which equipment may be stowed.

The cross-brackets 24 are attached at either end thereof to the stringers 26 by appropriate fastening devices such as nuts and bolts, rivets, or the like. Since it may be the case that the distance between stringers 26 can vary from vehicle 20 to vehicle 20, multiple lengths of cross-brackets 24 may be available for use in connection with the present invention. For example, and as seen in FIGS. 5 and 6, respectively, short cross-brackets 24a having a length of about 21 inches and long cross-brackets 24b having a length of about 29 inches may be employed. Generally, any appropriate length cross-bracket 24 may be employed without departing from the spirit and scope of the present invention.

In mounting the mounting plate 10 to the vehicle 20 at the roof 22 thereof, it may be the case that space available for the mounting plate 10 is limited. The vehicle 20 may for example have other antennas on the roof 22 thereof, ladders, storage spaces, and the like. Accordingly, in one embodiment of the present invention, the cross-brackets 24 and mounting plate 10 are configured to afford a high degree of flexibility in positioning the mounting plate 10 in space available at the roof 22 of the vehicle 20 between the stringers 26.

In particular, in one embodiment of the present invention, the periphery of the mounting plate 10 is provided with a plurality of regularly spaced slots 28, where each slot 28 extends for a distance generally along such periphery of the mounting plate 10. Likewise, each cross-bracket 24 is provided with a plurality-of regularly spaced slots 28, where each slot 28 extends for a distance generally along the longitudinal extent of such cross-bracket 24. Note in particular and with regard to the cross-brackets 24a, 24b (FIGS. 5 and 6) that the slots 28 therein may extend for substantial distances, on the order of 8 inches, and may be separated from one another by only a half inch or so.

Accordingly, the cross-brackets 24 may be mounted at appropriate locations on the stringers 26, and the mounting plate may be mounted at an appropriate location on the mounted cross-brackets 24. As with the cross-brackets 24, the mounting plate 10 is attached at opposite sides thereof to the stringers 26 by appropriate fastening devices 30 such as nuts and bolts, rivets, or the like that extend through both the slots 28 in the mounting plate 10 and the slots 28 in respective cross-brackets 24.

Moreover, because of the extending slots 28 on each of the mounting plate 10 and cross-brackets 24, and as shown, the position of the mounting plate 10 at the roof 22 of the vehicle 20 can be adjusted within a fairly high range. In particular, and as seen, the extending slots 28 allow fine-tuning of the position of the mounting plate 10 within the extent of such slots 28. For example, if a fastener 30 extends through a particular extending slot 28 on the mounting plate 10 and a particular extending slot 28 on one of the cross-brackets 24 and is not tightened, the mounting plate 10 may be moved along the cross-bracket 24 within a range defined by each particular extending slot 28. Once finally positioned, the fastener 30 is tightened to secure the mounting plate 10 in the final position to the cross-bracket 24. Of course, the mounting plate 10 may be attached to the cross-brackets 24 by a plurality of fasteners 30, each fastener 30 extending through a particular extending slot 28 on the mounting plate 10 and a particular extending slot 28 on one of the cross-brackets 24, and therefore the full-range of each slot 28 may not be employable due to positions of fasteners 20 in other slots 28.

Figure 7:
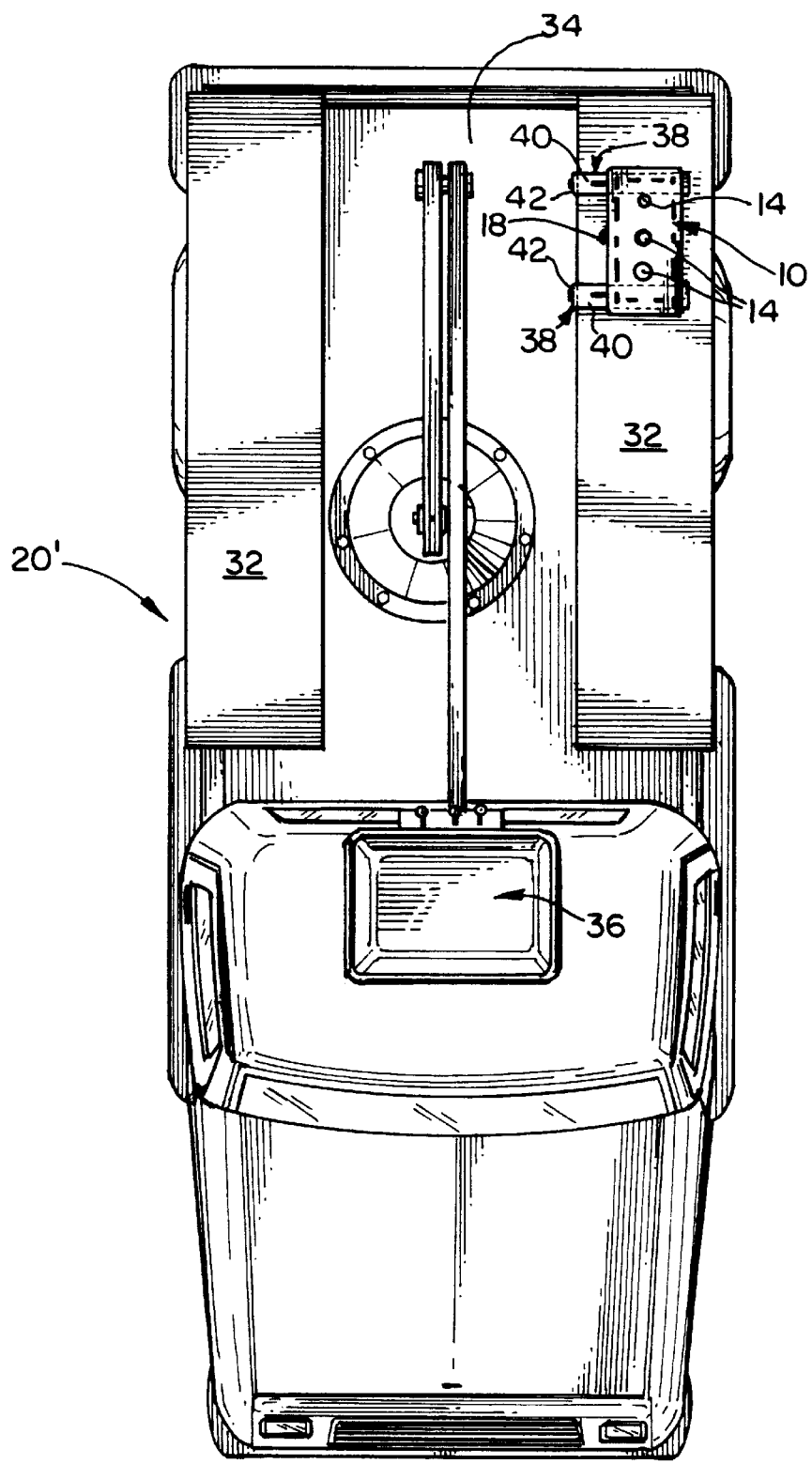
FIG. 7 is a top plan view of the mounting plate of FIG. 2 mounted to a roof of a cherry-picker-type service vehicle or the like in accordance with another embodiment of the present invention.
Figure 7A:
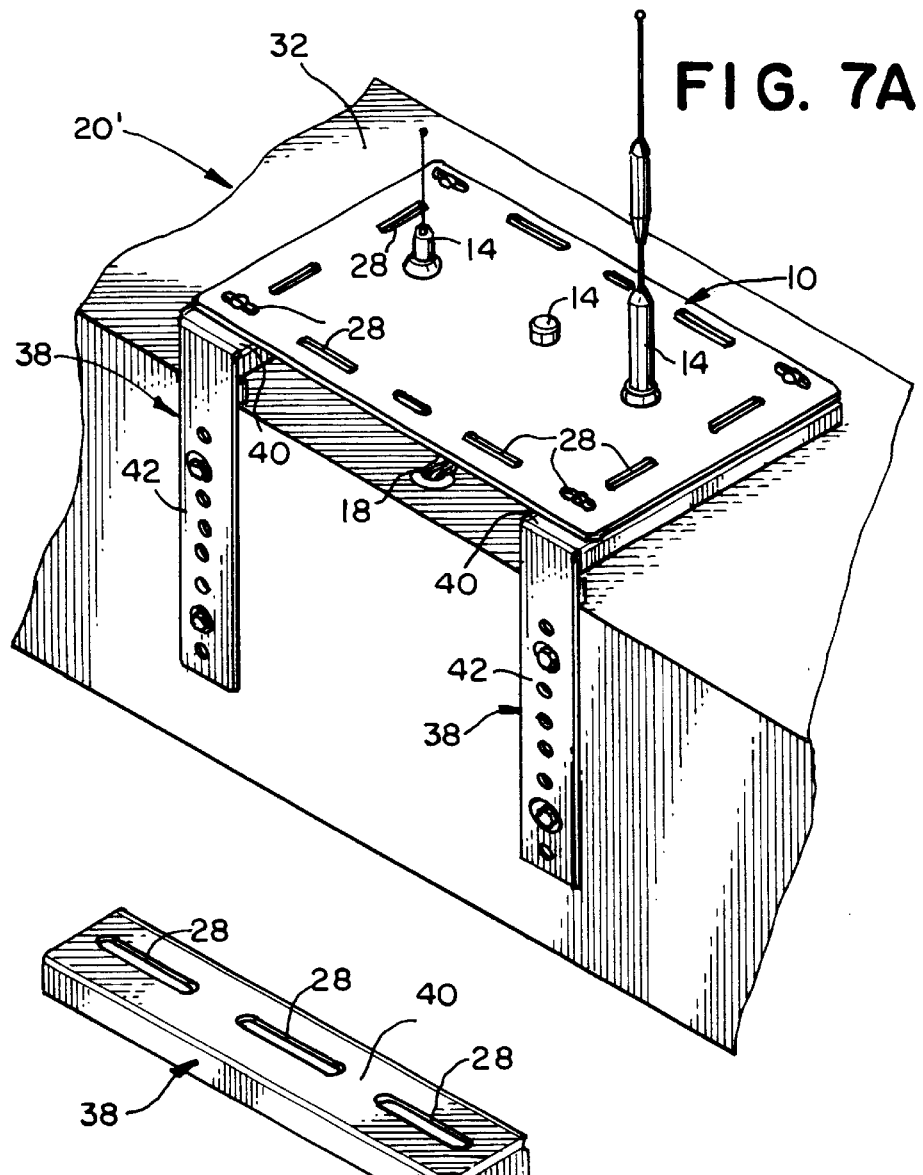
FIG. 7A is a perspective view of the mounting plate and vehicle of FIG. 7.

Referring now to FIGS. 7 and 7A, it is seen that a service vehicle 20' such as a 'cherry picker' utility truck may have utility compartments 32 along either side of the vehicle 20' which in combination define a service well 34 within which is stored service equipment such as an extendable boom 36. As may be appreciated, such vehicles 20' typically do not have any stringers 26 to which the above-disclosed cross-brackets 24 may be mounted, and at any rate employing such cross-brackets 24 would interfere with movement of the extendable boom 36 to and from the service well 34. A mounting plate 10 therefore cannot be attached to such service vehicle 20' by such cross-brackets 24.

Figure 8:
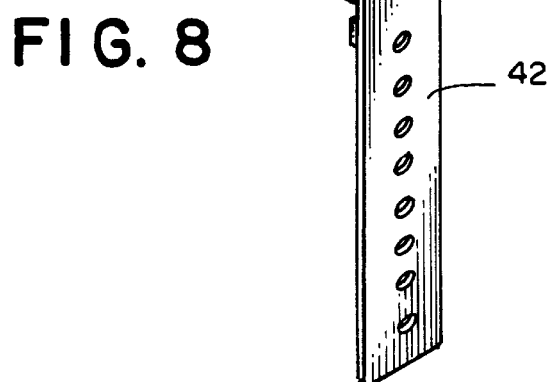
FIG. 8 is a perspective view of an angle bracket mounting the mounting plate of FIGS. 1 or 2 to the vehicle of FIG. 7.

Accordingly, to accommodate such vehicle 20', and in another embodiment of the present invention, the mounting plate 10 is mounted to a pair of angle-brackets 38 that are mounted to one or more of the utility compartments 32. As seen in FIG. 8, each angle-bracket 38 has a horizontal portion 40 that is generally similar to if not identical with the short cross-bracket 24a of FIG. 5, and a vertical portion 42 by which the angle-bracket 38 is attached to a generally vertical surface of the utility compartment 32 by way of appropriate fasteners. Note that by attaching the angle-brackets 38 at a vertical surface, mounting apertures created within the utility compartment 32 at such vertical surface are less susceptible to water intrusion as compared to mounting apertures created within a generally horizontal surface.

As seen in FIGS. 7 and 7A, each angle-bracket 38 may be positioned on an inboard vertical surface of a utility compartment 32 and therefore adjacent the service well 34, with the horizontal portion 40 extending away from the service well 34. Accordingly, a mounting plate 10 mounted to the angle-brackets 38 resides generally above the utility compartment(s) 32 and out of the way of movement of the extendable boom 36 to and from the service well 34. The angle-brackets 38 and the mounting plate 10 mounted thereto may of course be positioned elsewhere without departing from the spirit and scope of the present invention.

As shown in FIG. 7, and as with the cross-brackets 24, the horizontal portions 40 of the angle-brackets 38 extend generally transversely with respect to the vehicle 20', although such horizontal portions 40 could extend in other directions depending on where the angle-brackets 38 are mounted to the vehicle 20'.

As before, in mounting the mounting plate 10 to the vehicle 20' at the roof 22 thereof, it may be the case that space available for the mounting plate 10 is limited. The vehicle 20' may for example have other antennas on the roof 22 thereof, ladders, storage spaces, and the like. Accordingly, and again, in one embodiment of the present invention, the cross-brackets 24 and mounting plate 10 are configured to afford a high degree of flexibility in positioning the mounting plate 10 in space available at the roof 22 of the vehicle 20' by providing the mounting plate 10 and the horizontal portions 40 of the angle-brackets 38 with a plurality of regularly spaced slots 28 in the manner described above. Accordingly, the angle-brackets 38 may be mounted at appropriate locations on the vehicle 20', and the mounting plate may be mounted at an appropriate location on the mounted angle-brackets 38, all by way of appropriate fasteners.

In the foregoing description, it can be seen that the present invention comprises a new and useful mounting assembly for mounting one or more antennae 14 or the like to a roof 22 of a vehicle 20, 20' or the like, where the mounting assembly minimizes the number of apertures that must be created within the roof 22 of the vehicle 20, 20' in connection with mounting such antennae 14 to such vehicle 20, 20'. It should be appreciated that changes could be made to the embodiments described above without departing from the inventive concepts thereof. Moreover, although the present invention is described primarily in terms of a mounting assembly for a service vehicle 20, 20' or the like, the mounting assembly may also be employed on other types of vehicles and other non-vehicle objects without departing from the spirit and scope of the present invention. For example, the mounting assembly may be employed atop a building. It should be understood, therefore, that this invention is not limited to the particular embodiments and uses disclosed, but it is intended to cover modifications within the spirit and scope of the present invention as defined by the appended claims.

What is claimed is:

1. A mounting assembly mounting an antenna to a roof of a vehicle, the assembly comprising:
   a mounting plate including a mounting pad for mounting the antenna to the mounting plate;
   a pair of brackets to which the mounting plate is mounted, each bracket being mounted to the roof of the vehicle such that the bracket extends generally horizontally and generally transversely with respect to the vehicle, the pair of brackets being spaced from each other generally longitudinally with respect to the vehicle, the mounting plate as mounted to the pair of brackets extending generally longitudinally therebetween; and
   a pair of stringers to which each bracket is mounted, the stringers being mounted to the roof of the vehicle such that each stringer extends generally horizontally and generally longitudinally with respect to the vehicle, the pair of stringers being spaced from each other generally transversely with respect to the vehicle, each bracket as mounted to the pair of stringers extending generally transversely therebetween.

2. The assembly of claim 1 further comprising the antenna.

3. The assembly of claim 2 wherein the antenna is one of a communications antenna for effectuating voice and/or data communications, a positioning antenna for effectuating position determination, and a panic antenna for receiving notification of an emergency from a technician adjacent the vehicle.

4. The assembly of claim 1 for mounting a plurality of antennae to the vehicle, wherein the mounting plate includes a plurality of mounting pads for mounting the plurality of the antennae to the mounting plate.

5. The assembly of claim 1 in combination with the vehicle, wherein each bracket is a cross-bracket positioned generally transversely with respect to the vehicle.

6. The assembly of claim 5 wherein the vehicle includes a pair of stringers that are positioned on the roof thereof, and wherein each cross-bracket is mounted to the stringers.

7. The assembly of claim 6 wherein the stringers are positioned generally longitudinally with respect to the vehicle and each cross-bracket extends generally laterally between the stringers.

8. The assembly of claim 6 wherein the stringers are components of a rack on the roof of the vehicle.

9. The assembly of claim 1 wherein the mounting plate is provided with a plurality of regularly spaced slots at a periphery thereof and each bracket is provided with a plurality of regularly spaced slots.

10. The assembly of claim 9 wherein each slot in the mounting plate extends for a distance generally along the periphery of the mounting plate.

11. The assembly of claim 9 wherein each slot in each bracket extends for a distance generally longitudinally.

12. The assembly of claim 9 wherein the mounting plate is mounted to each bracket by a fastening device that extends through both one of the slots in the mounting plate and one of the slots in the bracket, the extended-through slots allowing the mounting plate to be adjustable with respect to the bracket.

13. A mounting assembly in combination with a vehicle and mounting an antenna to a roof of the vehicle, the assembly comprising:

a mounting plate including a mounting pad for mounting the antenna to the mounting plate;

at least one bracket to which the mounting plate is mounted, each bracket for being mounted to the roof of the vehicle, wherein each bracket is an angle-bracket and has a horizontal portion to which the mounting plate is mounted and a vertical portion for attaching the angle-bracket to a generally vertical surface of the vehicle, wherein the vehicle has utility compartments along either side thereof which in combination define a service well within which is stored service equipment movable therefrom, and wherein each angle-bracket is positioned on an inboard vertical surface of a utility compartment and adjacent the service well, with the horizontal portion thereof extending away from the service well such that the mounting plate mounted thereto resides generally above the utility compartment and out of the way of movement of the stored service equipment.

* * * * *